July 13, 1943.  O. A. PETERS  2,324,234
IRRIGATOR
Filed Oct. 7, 1942　　2 Sheets-Sheet 1
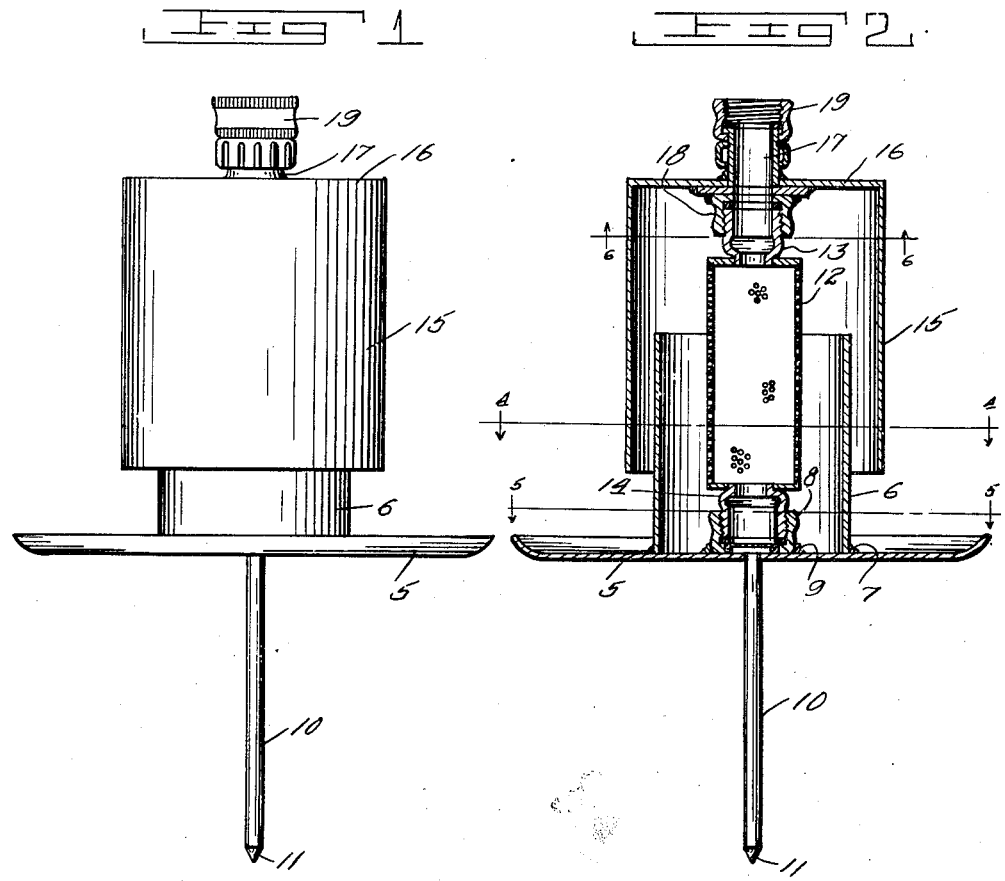
Inventor
Otho Andrew Peters
By Clarence A. O'Brien
and Harvey B. Jacobson
Attorneys July 13, 1943. O. A. PETERS 2,324,234
IRRIGATOR
Filed Oct. 7, 1942 2 Sheets-Sheet 2
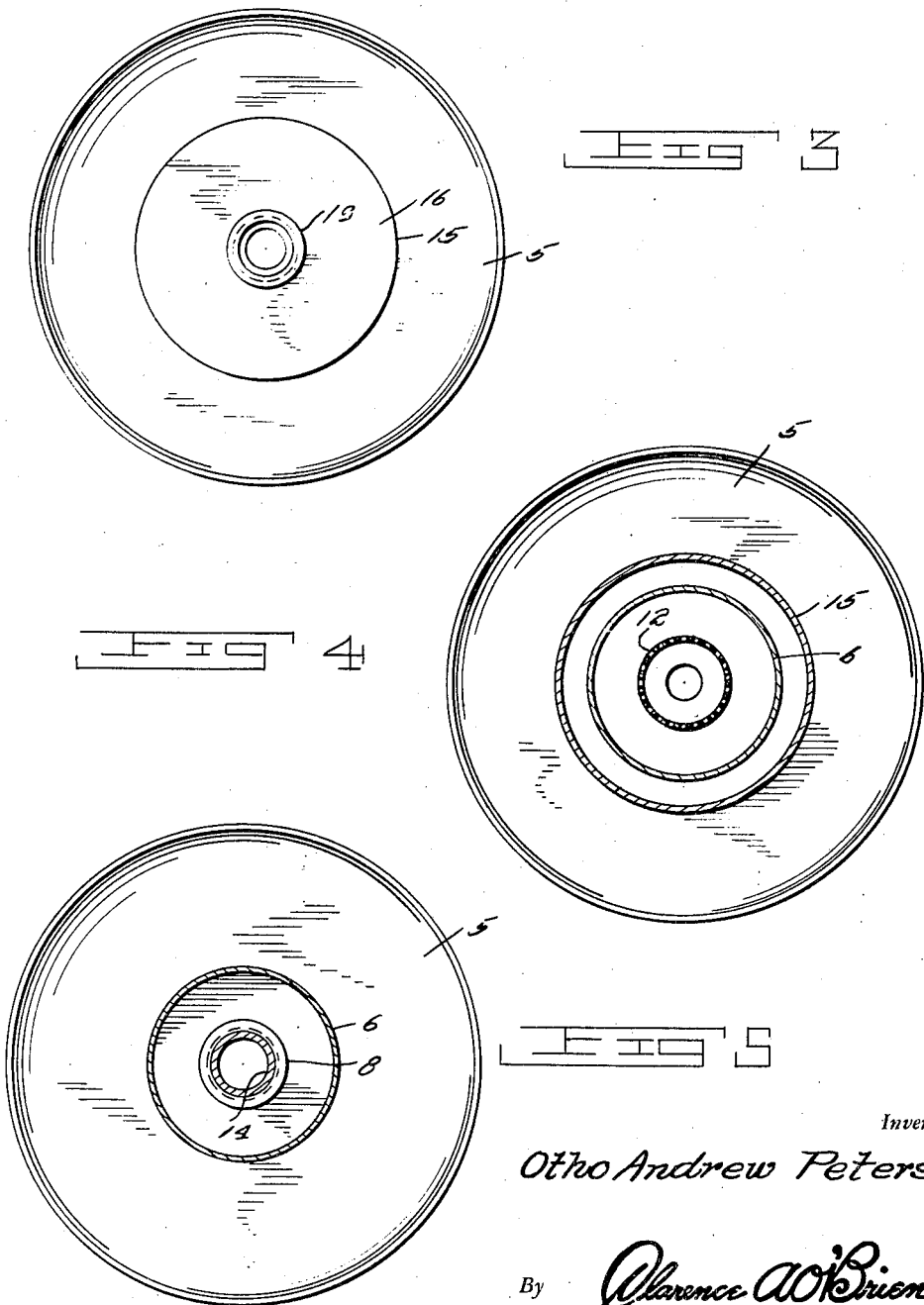
Inventor
Otho Andrew Peters
By Clarence A. O'Brien
and Harvey B. Jacobson
Attorneys Patented July 13, 1943

2,324,234

UNITED STATES PATENT OFFICE 2,324,234
IRRIGATOR

Otho Andrew Peters, Deer Park, Wash., assignor of one-eighth to Walter M. Leuthold, one-eighth to Nellie H. Peters, one-eighth to Genora E. Follevaag, all of Deer Park, Wash., and one-eighth to George W. Peters, Spokane, Wash.

Application October 7, 1942, Serial No. 461,163

2 Claims. (Cl. 299—76)

This invention relates to new and useful improvements in water distributing devices, and more particularly to an irrigator for gardens and the like.

The principal object of the present invention is to provide a garden irrigator which, due to its specific construction, will not wash away earth when in use.

Another important object of the invention is to provide an irrigator of the character stated which can be readily taken apart whenever desired.

These and other important objects and advantages of the invention will become apparent to the reader of the following description.

In the drawings:

Figure 1 represents a side elevational view.

Figure 2 is a vertical sectional view.

Figure 3 is a top plan view.

Figure 4 is a section on line 4—4 of Figure 2.

Figure 5 is a sectional view on line 5—5 of Figure 2.

Figure 6 is a section on line 6—6 of Figure 2.

Referring to the drawings wherein like numerals designate like parts, it can be seen that numeral 5 denotes a saucer-shaped plate having an upstanding cylindrical shell 6 at its central portion, preferably welded at its lower end, as at 7, to said saucer-like plate.

An internally threaded socket 8 is also welded, as at 9, to the central portion of the plate 5 and within the confines of the shell 6. It will here be noted that a pin 10 is provided, and that this pin 10 is pointed at its lower end 11 to facilitate insertion in the earth, while its upper end is suitably secured to the center of the plate 5. This pin 10 is used as an anchor for the irrigator.

The irrigator further includes an elongated perforated barrel 12 having end walls at its upper and lower ends to which are attached hollow externally threaded coupling members 13, 14, respectively. The lower coupling member 14 is adapted for disposition into the socket member 8 so as to support the barrel 12 in upright position, as shown in Figure 2.

Numeral 15 denotes an outer shell substantially larger in diameter than the shell 6, so that when it is properly supported, it will be uniformly spaced from the shell 6 while depending a substantial distance below the upper edge of the shell 6.

The upper end of the shell 15 has a top wall 16 formed with a central opening into which extends a short tube 17. To the inner side of this top wall 16 is secured a socket 18 into which is disposed the externally threaded coupling member 13.

A swivelly connected, internally threaded coupling element 19 is provided on the upper end of the short tube 17.

It can now be seen that a water supply hose can be connected to the coupling 19 and water supplied to the irrigator. The water enters the perforated barrel 12 and sprays out into the shell 6 and against the inside of the shell 16. This action dissipates the normal pressure of the water to a considerable extent and permits the water to flow out at a retarded rate over the saucer-like plate 5, without any tendency to wash away adjacent earth.

Obviously, the device can be moved from point to point as conditions demand.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An irrigator comprising a base plate, a shell rising from the plate, a perforated barrel rising from the plate within the confines of the shell, a second shell of larger diameter overlapping the first-mentioned shell and being spaced from the plate, and a water supply line connection at the top of the last-mentioned shell.

2. An irrigator comprising a base plate, a shell rising from the plate, a perforated barrel rising from the plate within the confines of the shell, a second shell of larger diameter overlapping the first-mentioned shell and being spaced from the plate, a water supply line connection at the top of the last-mentioned shell, said perforated barrel having its ends positively secured to the second-mentioned shell and to the base plate.

OTHO ANDREW PETERS.